United States Patent [19]

Preston et al.

[11] 4,423,945

[45] Jan. 3, 1984

[54] FILM HOLDING AND AGITATING APPARATUS

[75] Inventors: Seaton T. Preston, Winnetka; Frank L. Greenwald, Western Springs; William D. Eich, Arlington Heights; Robert Berger, Chicago, all of Ill.

[73] Assignee: G and G Products, Inc., Niles, Ill.

[21] Appl. No.: 382,130

[22] Filed: May 26, 1982

[51] Int. Cl.$^3$ .................... G03B 3/04

[52] U.S. Cl. .................... 354/313; 354/328; 354/329

[58] Field of Search .................... 354/312, 313, 316, 328, 354/329, 330, 331, 335, 341, 322; 366/166, 255, 332

[56] References Cited

U.S. PATENT DOCUMENTS

| | | | |
|---|---|---|---|
| 2,168,846 | 8/1939 | Parker | 354/330 |
| 3,672,289 | 6/1972 | Kelso | 354/322 |
| 3,704,660 | 12/1972 | Hill | 354/322 |
| 3,724,353 | 4/1973 | Holbert | 354/313 |

*Primary Examiner*—A. A. Mathews

*Attorney, Agent, or Firm*—Allegretti, Newitt, Witcoff & McAndrews, Ltd.

[57] ABSTRACT

An apparatus for use in developing film is disclosed. The apparatus is designed to hold the film during development in a processing solution. The apparatus fits and substantially closes the processing solution cannister to provide a substantially lightless processing environment. The apparatus further moves the film during development to agitate the processing solution.

14 Claims, 2 Drawing Figures

10
26
40
20
22
22
22
24
30
16
38
12
18
PULSE GENERATOR
TEMPERATURE CONTROL 10
42
44
TO 30
SOLENOID
26
46
20
50
48
22
16
36
14
24
28
34
36
14
52
32

FILM HOLDING AND AGITATING APPARATUS

BACKGROUND OF THE INVENTION

The present invention relates generally to an apparatus for processing film and more particularly to a film developing apparatus wherein agitation of the processing solution is automatically provided in a timed sequence.

Film developing is a multi-step process requiring immersion of the film negative or positive in a series of processing fluids. There are four primary factors which affect and influence the quality of the finished negative or slide. These are (i) the temperature of development, (ii) the time of development, (iii) the degree and consistency of agitation, and (iv) the condition of the developing chemistry, i.e., the processing solutions.

More particularly, the temperature of processing fluids must often be maintained within a certain range. Departure therefrom may drastically alter colors and/or color intensity. Likewise, the processing time, i.e., the time of immersion in any given fluid, must be closely controlled.

The condition of the processing chemistry involves two aspects. First, the concentration of any given processing solution must be maintained at a predetermined level, and as dilution occurs with use, the solution must be replaced or replenished. Second, the solution must be as contaminant-free as possible.

Agitation of the film is particularly significant as it impacts upon both temperature and condition of the processing chemistry. First, if the solution is not properly agitated, a temperature gradient may develop within the tank from top to bottom. A film suspended in such an unevenly-heated solution often develops unevenly due to more rapid development in the upper, warmer solution and slower development in the lower, cooler solution.

Secondly, when a photographic developing solution is unagitated, the solution acts at an undesirably slow rate. With a still solution and a film suspended motionless therein, only a very small percentage of solution contacts the film, and the chemical processing reaction therebetween creates a barrier to further reaction. The spent portion of the processing solution, adjacent the film, must be circulated or agitated away to permit further development.

Moreover, the reaction byproducts often stain the film if the contact time is sufficient and the film absorbs one of the byproducts. Proper agitation of the solution increases the volume thereof reacting with the film and substantially avoids both the reaction barrier and by-product staining.

In large-scale film processing operations, agitation is provided in any number of ways, including gas "burst" injection through orifices in the processing tank, constant film movement within the tank, and/or constant rotation of the tank itself. However, in small scale or batch processing, agitation has to date been provided manually, as by shaking the processing cannister.

A number of disadvantages exist with respect to any manual agitation process. For example, a temperature control problem is experienced if the processing cannister is removed from the system for purposes of agitation. A manual agitation process further requires substantially constant attention if the agitation is to be frequent and/or timed.

SUMMARY OF THE INVENTION

In a principal aspect, the present invention is an improved film developing apparatus wherein agitation is automatically provided. The developer includes a power head, adapted to interconnectingly receive a film holder, and an energizer connected to the power head. The energizer energizes the power head by providing a series of pulses thereto. In response to each pulse, the power head first lifts the film holder to an energized position and then lowers the film holder to a rest position. Movement of the film holder between the rest position and the energized position agitates the processing solution to substantially avoid temperature and concentration gradients therein.

It is thus an object of the present invention to provide an improved film developing apparatus. Another object is a film developer wherein agitation of the processing solution is automatic. Still another object is a film processing solution agitator wherein the agitation is automatic and timed.

It is a further object of the present invention to provide an improved, small scale and inexpensive film processor with automatic timed agitation. Yet another object is a solution agitator for a film processing system, wherein agitation is provided by movement of the film and film holder.

These and other features, objects and advantages of the present invention are set forth or apparent in the following detailed description.

BRIEF DESCRIPTION OF THE DRAWING

A preferred embodiment of the present invention is described herein with reference to the drawing, wherein.

DETAILED DESCRIPTION OF THE PREFERRED EMBODIMENT

Figure 1:
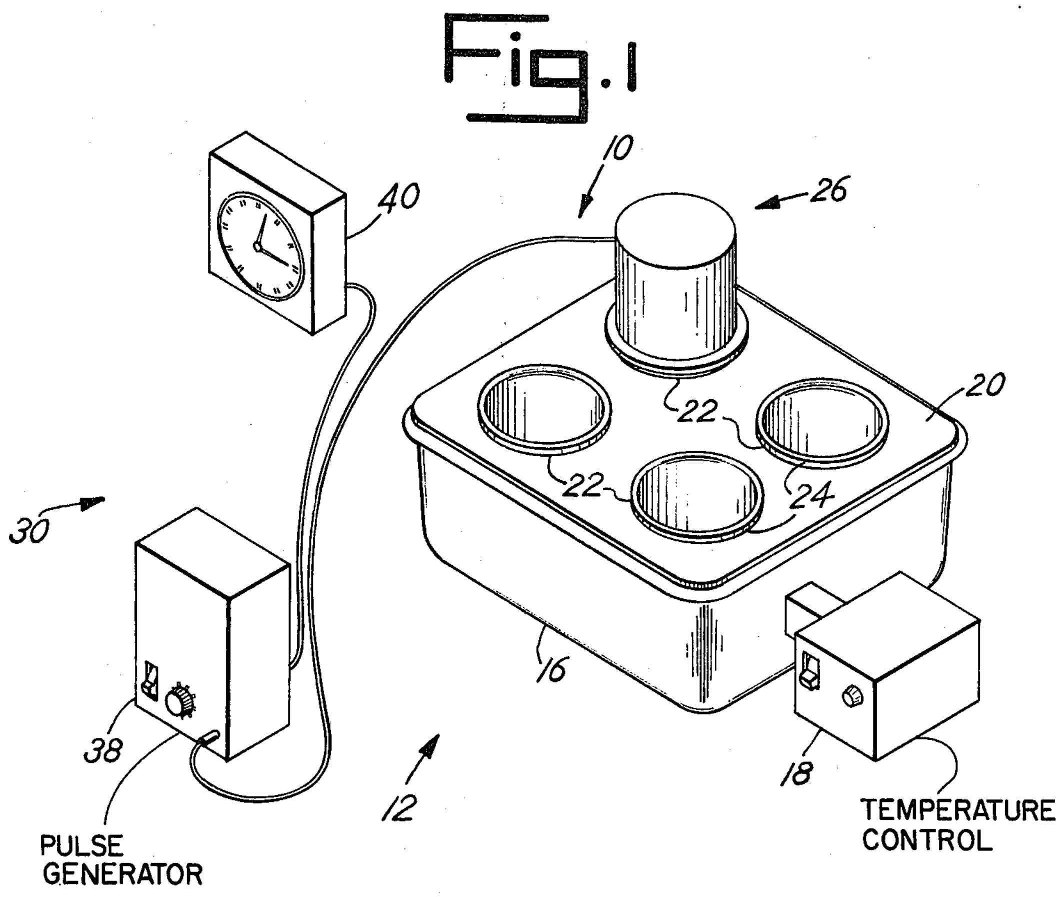
FIG. 1 is a perspective view of a film processing system incorporating a preferred embodiment of the present invention.
Figure 2:
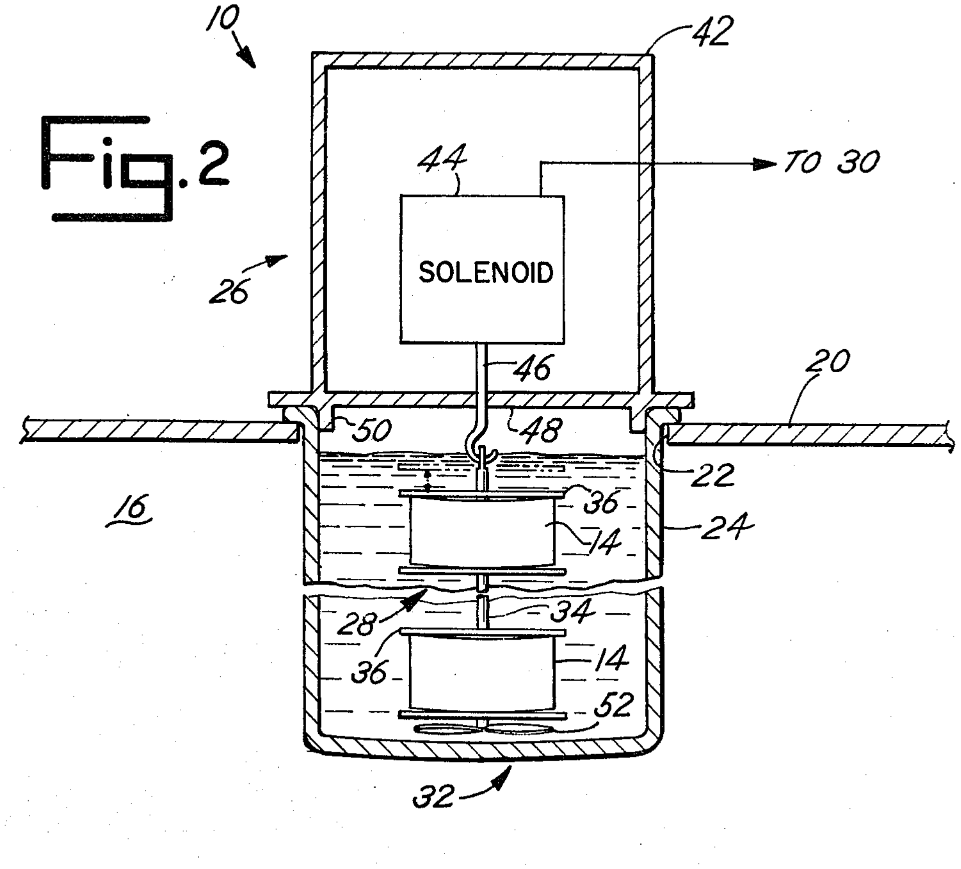
FIG. 2 is a schematic, partial cross-sectional view of the preferred embodiment shown in FIG. 1.

In FIGS. 1 and 2, a preferred embodiment of the present invention is shown as a film processing apparatus 10, as incorporated into a processing system 12. The processing system 12 is utilized to develop a negative or slide film 14 by immersion thereof in certain processing solutions and rinses.

As shown, the processing system 12 includes a bath 16 adapted to be filled with water and temperature-control means 18 for maintaining the temperature thereof. The bath 16 is further adapted to receive a cover 20, defining a series of openings 22. Cannisters 24, containing the various solutions and rinses, fit within the openings 22, resting upon the cover 20 and submerge in the water held by the bath 16. That water, in conjunction with the temperature-control means 18, regulates and maintains the temperature of the solutions and rinses.

As best shown in FIG. 2, the film processing apparatus 10 includes power head means 26, film holding means 28, energization means 30, and propeller means 32. The power head means 26 is connected to the energization means 30 and interconnectingly receives the film holding means 28. In this preferred embodiment, the film holding means 28 includes a real holder 34 adapted to hook onto the power head means 26. The reel holder 34 holds one to seven film developing reels 36, each adapted to receive one film 14. The developing reels 36 are releasably secured to the reel holder 34, whereby loading of the reels 36 is facilitated.

The energization means 30 energizes the power head means 26 by providing thereto a series of electrical pulses. In this preferred embodiment, the energization means 30 includes a pulse generator 38 and a timer 40. The pulse generator 38 and the timer 40 are selectively adjustable such that the energization means 30 is capable of providing a pulse series in the range of one pulse/per minute to one pulse/per second. Alternatively, and preferably, the energization means 30 provides a pulse train of adjustable length (e.g., at a rate of one pulse per second) followed interveneally by periods in the range of fifteen seconds to sixty seconds.

In response to each pulse from the energization means 30, the power head means 26 raises or lifts the film holding means 28 from a rest position (shown in solid line in FIG. 2) to an energized position (shown in dotted line). The power head means 26 then returns the film holding means 28 to the rest position. The movement of the film holding means 28 therebetween is preferably approximately one-half inch.

In this preferred embodiment, the power head means 26 includes a housing 42 and solenoid 44, within the housing 42. The solenoid 44 includes, as the core member, a rack-support arm 46, extending through the housing 42. The solenoid 44 receives the pulse series from the energization means 30 and in a conventional fashion, the solenoid 44 responds to each pulse by momentarily retracting the rack-support arm 46, so as to provide the desired movement of the film holding means 28.

The power head means 26, or more particularly the housing 42, is adapted to fit the cannisters 24 such that passage of light therebetween is virtually entirely avoided so as to provide a "lighttight" environment, as that term is known in the art. In this context, the housing 42 includes a lower face portion 48, adapted to engage the cover 20, and a collar 50 extending from the lower face portion 48, adapted to engage the inner periphery of the cannister 24.

In this preferred embodiment, the propeller means 32 is secured to the film holding means 28 at the lower extension thereof, i.e., opposite the connection to the power head means 26. The propeller means 32 causes the film holding means 28 to rotate as it moves, in both directions, between the rest position and the energized position through the processing solution or rinse. As shown, the propeller means 32 is a curved blade 52 rigidly secured to and extending outwardly from the reel holder 34 of the film holding means 28.

The film developing apparatus 10 provides both linear and rotational agitation of the processing solution. The resulting agitation is substantial due to the rapid pulsing action and movement of the film holding means 28. This agitation substantially avoids temperature and concentration gradients within the cannister 24, such that processing of the film 14 is substantially enhanced.

A single preferred embodiment of the present invention has been described herein. It is to be understood that modifications and changes can be made without departing from the true scope and spirit of the present invention, as defined by the following claims.

We claim:

1. A film processing apparatus for use in conjunction with a film processing container comprising, in combination:

film holding means for holding a film, said film holding means being operable within said film processing container between a rest position and an energized position;

energization means for providing a series of pulses; and power head means, adapted to fit said film processing container and interconnect with said film holding means, for receiving said series of pulses and for moving said film holding means between said rest position and said energized position in response to each pulse within said series, said power head means substantially closing said film processing container so as to substantially avoid the passage of light into said film processing container during movement of said film holding means therein;

whereby said film processing apparatus provides an agitating action as a result of the movement of said film holding means.

2. A film processing apparatus as claimed in claim 1 wherein said film holding means is releasably secured to said power head means to facilitate loading of said film holding means.

3. A film processing apparatus as claimed in claim 1 wherein said film holding means includes a reel holder and at least one film developing reel secured thereto.

4. A film processing apparatus as claimed in claim 3 further comprising propeller means for rotating said film holding means during movement between said rest position and said energized position.

5. A film processing apparatus as claimed in claim 4 wherein said propeller means includes a curved blade secured to said reel holder.

6. A film processing apparatus as claimed in claim 1 further comprising propeller means for rotating said film holding means during movement between said rest position and said energized position.

7. A film processing apparatus as claimed in claim 6 wherein said propeller means includes a curved blade secured to said film holding means.

8. A film processing apparatus as claimed in claim 1 or 6 wherein said energization means is adjustable so as to selectively time said pulses.

9. A film processing apparatus as claimed in claim 8 wherein said energization means includes a pulse generator and a timer interconnected thereto.

10. A film processing apparatus as claimed in claim 1 or 6 wherein said power head means includes a housing and a solenoid for receiving said series of pulses.

11. A film processing apparatus as claimed in claim 10 wherein said solenoid includes a rack-support arm extending through said housing, said rack-support arm being retracted by said solenoid in response to each pulse in said series.

12. In a system for developing a film of the type including a bath, at least one cannister containing a solution and submerged in said bath, and film holding means for immersing said film in said cannister, an improved means for agitating said solution comprising, in combination:

power head means for interconnecting with and supporting said film holding means during immersion in said solution, said power head means being adapted to fit said cannister and to substantially close said cannister such that the passage of light into said cannister is substantially avoided; and energization means for providing a series of pulses to said power head means, said power head means responsively moving said film holding means between a rest position and an energized position;

whereby said solution is substantially agitated by movement of said film holding means between said rest position and said energized position.

13. An improved means for agitating as claimed in claim 12 further comprising propeller means, secured to said film holding means, for rotating said film holding means during movement by said power head means, whereby agitation is substantially enhanced.

14. An improved means for agitating as claimed in claim 12 or 13 wherein said power head means includes a solenoid having a rack-support arm, said solenoid receiving said series of pulses and responsively retracting said rack-support arm, said film holding means being secured to said rack-support arm.

* * * * *